3,541,006
ULTRAFILTRATION PROCESS
Harris J. Bixler, Lexington, and Gerald C. Rappe, Newton, Mass., assignors to Amicon Corporation, Lexington, Mass., a corporation of Massachusetts
No Drawing. Filed July 3, 1968, Ser. No. 742,153
Int. Cl. B01d 13/00, 31/00
U.S. Cl. 210—23                              6 Claims

ABSTRACT OF THE DISCLOSURE

A process (and apparatus for carrying out said process) for improving the throughput rate of membrane ultrafilters comprising the introduction of solid particulate materials into the liquid on the upstream side of the membrane. It has been discovered that such particulate matter, which is advantageously of an inert polymeric material, or glass, augment the diffusion of retained solute from a membrane surface and thereby increase flux through the membrane.

BACKGROUND OF THE INVENTION

In carrying out membrane-modulated separation processes, the problem is encountered whereby a high solute concentration area is built up along the upstream surface of the membrane; i.e. the surface which faces the solution or suspension being ultrafiltered. It has been found that this so-called "concentration polarization" of the membrane can be minimized, at least in many separations such as desalination processes and the like by use of the so-called "thin-channel" process wherein liquid to be ultrafiltered is passed at high velocity laminar flow through a thin channel across the face of the membrane. This process is limited, in its practical application, to rather sophisticated systems where the pressure head is available to achieve the required velocities in the thin channel. Moreover, the process requires a channel of carefully sized dimensions, and has been believed to be not directly applicable to separations of macromolecule solutions. Thus in most ultrafiltration equipment utilized today, concentration polarization remains a serious quantitative limitation on the mass-transport through the membrane. This is particularly so in the so-called batch cells, and in various other industrial apparatus such as that used in treating sewerage, paper plant effluent and the like.

As used in this application, the term "ultrafiltration" is defined broadly to include both ultrafiltration and reverse osmosis.

SUMMARY OF THE INVENTION

Therefore, it is an object of the present invention to provide means to improve the mass transport rates of ultrafiltration processes.

It is another object of the invention to provide means for reducing the concentration polarization of ultrafiltration membranes.

A further object of the invention is to provide improved ultrafiltration apparatus.

Other objects of the invention will be obvious to those skilled in the art on reading the instant specification.

The above objects have been substantially achieved by utilizing the discovery that small particles, most advantageously those in the range of from about 10 to about 500 microns, when agitated in the liquid being ultrafiltered, and proximate the membrane surface, contribute surprising improvements in mass throughput, i.e. flux. These improvements are believed to be assignable in part to the (1) mixing action of the particles which tends to mix solution of higher solute concentration which solution is proximate the membrane with solution of lower concentration which is more remote from the membrane surface and (2) the mechanical action of the beads on the membrane whereby they help to both vibrate and clean the membrane surface.

The beads may be constructed of any suitable material of construction but are, of course, preferably chemically inert. The specific gravity of the beads is conveniently about the specific gravity of the liquid being ultrafiltered, but not so great they they will tend to settle out and occlude the surface of the membrane and not so small that they tend to float excessively. While the viscosity of the liquid being ultrafiltered and the degree of agitation must be considered in selecting the optimum size and density of the particles for a particular operation, it has been found to be generally true that particles having a specific gravity of over about 3 are less adavntageous in solutions having a specific gravity of less than about 1.5 because they do tend to settle out on the membrane surface so readily. Similarly, it has been found that the beads should have an average diameter of at least about 10 microns—and advantageously not over about 500 microns—or, in many operations, the amount of energy imparted thereto by the agitation means will be insufficient to overcome the drag effect of the fluid and they too will sink (or float) and agglomerate, e.g. on the surface of the membrane (or solution).

Another factor to consider, especially when a pump is used to circulate the particles through a membrane-filter cell, but also when high-velocity agitation is used, is the brittle character of the particles. It has been found that elastomeric particles such as are formed of styrene-butadiene copolymers, rubber etc. are of particular advantage in such circumstances because they resist breakage when impacted. The desired specific gravity may be obtained by filling the elastomer with sufficient clay, silica, carbon black, metal powder, or other filler to the extent desired to achieve the proper degree of buoyancy for the particular application.

ILLUSTRATIVE WORKING EXAMPLES

The following examples were carried out in well-stirred batch cells of the type known to the art and available from Amicon Corporation under the trade designation Model 50. The ultrafiltration membranes which were utilized, henceforth called Diaflo UM–1 and Diaflo UM–2 membranes, are also available from Amicon Corporation under these trade names. These membranes are formed of hydrogels of ionically-cross-linked polymeric materials of the type known to the art as polyelectrolyte complex resins. The solution being ultrafiltered was a 6.3% aqeous solution of a polysaccharide with an average molecular weight of 39,500; this solution had a specific gravity of 1.002 grams per cubic centimeter. The batch cells were operated with a 50 p.s.i. driving force across the membrane ultrafilter and with the polysaccharide solution at 37° C.

Flux across the membrane is presented in terms of cubic centimeters of filtrate per square centimeter of effective membrane ultrafilter surface per minute.

Working Example 1

The data presented in Table I relates to the use of glass beads having a specific gravity of 2.5 and of 100 microns average diameter.

TABLE I

| Run No. | Membrane | Volume percent particle | Flux | Percent gain flux |
|---|---|---|---|---|
| Control A | UM-1 |  | 0.0433 |  |
| 1 | UM-1 | 5.0 | 00.068 | 57 |
| 2 | UM-1 | 10.0 | 0.0918 | 112 |
| Control B | UM-2 |  | 0.0428 |  |
| 4 | UM-2 | 2.5 | 0.0674 | 57 |
| 5 | UM-2 | 5.0 | 0.0738 | 72 |
| 6 | UM-2 | 10.0 | 0.0673 | 57 |

Table I clearly indicates the flux improvements achieveable with glass beads. Note, however, that with the UM-2 membrane, i.e. the membrane more dependent on pore flow, there is a dropping off of flux gain as the volume is increased past 10%. This is attributed to the excessive settling of beads on the membrane surface which can result in a nominal 10% volume average concentration of beads resulting in a 50-60% concentration of beads at the membrane surface.

It has also been found that smaller glass beads, e.g. those having an average diameter of 29 microns, caused fluxes to decrease when used at 5 and 10 volume percent with UM-2 membranes. This has been determined to be because of the relatively small size-to-density ratio of these beads, their consequent tendency to settle out, and their greater tendency to pack closely—a consequence of their small size. To use such smaller beads, much more vigorous agitation would have been necessary to achieve the improvement in flow achievable by using the larger beads.

Working Example 2

The data presented in Table II relates to the use of plastic, i.e. poly(methyl methacrylate), beads having a specific gravity of 0.94 and an average diameter of about 60 microns. The diameters of these plastic beads are not as uniform as those of the glass beads described in Working Example 1; they range generally from beads having 40-micron diameters to beads having 100-micron diameters.

It will be noted that the lower specific gravity of the beads tends to allow higher volume concentration of beads because no gravitational settling takes place. Nevertheless, this lower specific gravity tends to result in a floating effect (at least in batch cells where the membrane is situated below the liquid to be filtered) and thereby a relatively inefficient use of beads. Actually in the specific example being presented; the polymer beads were distributed rather evenly throughout the solution by the available agitation.

TABLE II

| Run No. | Membrane | Volume percent particle | Flux | Percent increase |
|---|---|---|---|---|
| Control C | UM-2 |  | 0.0419 |  |
| 7 | UM-2 | 15 | 0.0503 | 20 |
| 8 | UM-2 | 20 | 0.0547 | 30.5 |
| 9 | UM-2 | 30 | 0.0630 | 50 |
| 10 | UM-2 | 40 | 0.0549 | 31 |
| Control D | UM-1 |  | 0.0404 |  |
| 11 | UM-1 | 5 | 0.0461 | 14 |
| 12 | UM-1 | 10 | 0.516 | 28 |
| 13 | UM-1 | 20 | 0.683 | 69 |

What is claimed is:

1. A process for increasing the mass-transport rate across ultrafiltration membranes comprising the steps of
   (1) introducing into the liquid to be ultrafiltered from 5 to 40% by volume of solid particles having an average diameter from 10 to 500 microns and a specific gravity between 0.9 and 3, and
   (2) causing the agitation of said particles in the immediate vicinity of said membrane while simultaneously carrying out an ultrafiltration process utilizing said membrane as the ultrafilter.

2. The process as defined in claim 1 wherein said particles are glass beads.

3. The process as defined in claim 1 wherein said particles are elastomeric particles.

4. In filter apparatus of the type comprising a reservoir for holding liquid to be filtered, an agitating means in said reservoir and an ultrafiltration membrane as the filtration element therein, the improvement comprising the inclusion in said reservoir of solid particles for circulation in said liquid, said particles having an average diameter from 10 to 500 microns and a specific gravity between 0.9 and 3.

5. The apparatus of claim 4 wherein said particles are glass beads.

6. The apparatus of claim 4 wherein said particles are elastomeric.

References Cited
UNITED STATES PATENTS

| 1,296,685 | 3/1919 | Moore | 210—353 |
| 3,373,056 | 3/1968 | Martin | 210—23 X |
| 3,425,562 | 2/1969 | Hamer | 210—353 X |

REUBEN FRIEDMAN, Primary Examiner

F. A. SPEAR, JR., Assistant Examiner

U.S. Cl. X.R.

210—321, 353, 408